Feb. 8, 1955   N. J. EICH   2,701,392
METHOD OF MANUFACTURE OF INCAPSULATED ELECTRICAL APPARATUS
Filed Dec. 19, 1950

INVENTOR
N. J. EICH
BY
ATTORNEY

United States Patent Office 2,701,392
Patented Feb. 8, 1955

2,701,392
METHOD OF MANUFACTURE OF INCAPSULATED ELECTRICAL APPARATUS

Norbert J. Eich, Berkeley Heights, N. J., assignor to Bell Telephone Laboratories, Incorporated, New York, N. Y., a corporation of New York Application December 19, 1950, Serial No. 201,617

6 Claims. (Cl. 18—59)

This invention relates to a method of manufacture of incapsulated electrical components.

In the manufacture of incapsulated electrical components it has been found that appreciable variations in the electrical constants occur which are not accurately predictable. These changes have been attributed largely to the generation of internal pressures resulting from either the shrinkage of the enclosing capsule or the expansion of the enclosed component. Curing is believed to be the cause of these pressures since generally during this process the material of the capsule shrinks and heat is generated which causes an expansion of the component.

An object of this invention is to improve incapsulated electrical components. Other objects are to avoid changes in the electrical characteristics of components during fabrication and to reduce the tendency for internal pressures to build up in incapsulated components when they are subjected to increases of temperature.

One feature of this invention involves providing a fluid layer intermediate a component and its enclosing capsule and including a vent in the capsule so that the internal pressures between the capsule and the component are relieved by the bleeding of the fluid through the vent.

Another feature resides in utilizing a material for the intermediate layer that is solid at temperatures of the order of room temperature and becomes fluid at higher temperatures. More particularly the intermediate layer can be of a material which can be applied by a dipping, molding or similar coating process wherein the material is fluid and which has a softening point slightly less than the curing temperature of the material of the outer capsule. This prevents the building up of internal pressures during curing, the period when such pressures are most likely to occur.

The above and other objects and features of this invention will be more fully understood and appreciated from the following detailed description when read in conjunction with the accompanying drawing in which.

Figure 1:
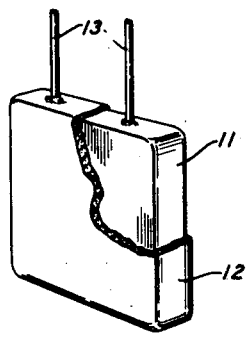
Fig. 1 is a perspective view of an electrical component coated with an underlayer which is fluid under the proper conditions, with portions thereof broken away for clarity of illustration.

Referring now to the drawing, an electrical component 11 such as a resistor, capacitor, or inductor which has been manufactured with desired electrical characteristics and is to be incapsulated, is shown in Fig. 1 coated with a layer 12 of material which softens well above room temperature. This layer can be applied in any convenient manner depending on the material. For example a dipping or casting process may be employed, or if the material is available in sheet form it can be bonded to the surfaces and leads of the component in that form. Suitable materials for this undercoating include waxes which melt at temperatures below the curing temperature of the material of the capsule, for example a mineral wax of microcrystalline structure obtained as a by-product of the distillation of petroleum, such as "Superla Wax," a product of the Standard Oil Company of Indiana melting at from 150 degrees to 155 degrees Fahrenheit, or "Biwax," a product of the Biwax Corporation melting at about 180 degrees Fahrenheit. Another undercoating which is suitable is a gel, in effect a supercooled liquid, which is viscous enough to maintain itself during the application of the outer coating. An example of such a material is a mixture of 92 per cent polyethylene, 7.5 per cent polybutene and 0.5 per cent of an antioxidant such as "Agrite" resin D.

Figure 2:
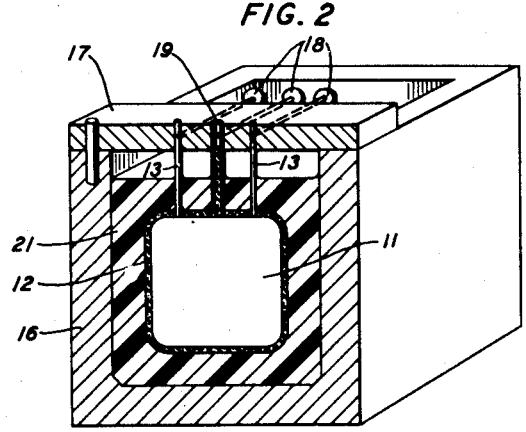
Fig. 2 is a sectioned perspective view of a mold suitable for the application to and curing of an outer capsule on the component of Fig. 1 with the capsule and underlayer also in section.
Figure 3:
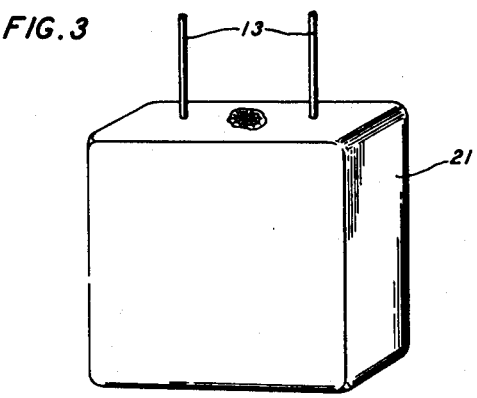
Fig. 3 shows a completed unit in perspective.

The incapsulating procedure readily lends itself to a variety of simple methods. In the illustrative embodiment of Fig. 2, it is effected in a mold lubricated with some material such as a silicone grease and into which the incapsulating material is poured. An open topped mold 16 is employed and the component is supported and centered therein by a bracket 17 having suitable clamping means 18 which engage the leads 13 of the component. The bracket may also be arranged to maintain the venting tube 19 in position. This venting tube 19 may be of metal or a rigid plastic and is arranged to pass through the wall of capsule 21 from the layer 12. In order to insure the maintenance of a passage to the exterior it is desirable to embed an end of the tube in the layer 12.

Following the mounting of the coated component in the mold with the vent properly positioned, the capsule 21 is applied. Although a number of materials are suitable for forming the capsule "Stypol 507E," a product of the H. H. Robertson Company of Pittsburgh, Pennsylvania, which is a styrene polyester casting resin has been found particularly convenient. This material can be poured as an unheated fluid after being mixed with about 2 per cent by weight of a peroxide catalyst. The catalyst may be of either liquid or solid type; for example "Lupersol DDM," manufactured by Lucidol Division of Novadel-Agene Corporation of Buffalo, New York is a liquid type peroxide catalyst and cyclohexanone peroxide is a powder type catalyst. Although external heat applied to the mold accelerates the setting of this styrene polyester the material sets sufficiently without heat so that it can be removed from the mold in about one-half hour. While it can be cured in the mold either with or without the application of heat this ties up the mold and therefore is uneconomical. It has been found preferable to cure the material in an oven at 250 degrees Fahrenheit for two hours after it has set in the mold for one-half hour. During the curing, heat is generated and the material shrinks. The generated heat and, where applied, the external heat causes the component to expand. Internal pressures are developed by this shrinkage of the capsule and expansion of the component which tend to cause displacement of the elements of the component if not relieved. Thus the spacing of capacitor electrodes, the thickness of dielectric, the position of lead connections and the position of inductance turns might be altered with accompanying changes in electrical constants. With the fluid underlayer intermediate the component and capsule operating in combination with the vent the tendency for internal pressure to build up is removed since it is relieved by bleeding of the fluid through the vent.

After the capsule walls have been cured, the projecting vent 19 can be cut off flush with the surface of the capsule. This vent can be left unsealed to continue to function as a means of relieving internal pressure which may develop when the component is raised to high temperatures. The undercoatings employed are such that they become fluid before damaging pressures have been built up by thermal expansion during the operation of the components; hence the components are further protected.

It is to be understood that this invention is not to be limited to the particular structures and methods of fabrication suggested nor is it applicable solely to single components. The term "incapsulate" includes the incasement of apparatus by a seamless body formed by such methods as dipping or by molding either in an open mold or in a closed mold which may be under pressure. The construction of the vent and the manner in which it is associated with the coating may be varied and the procedure can be applied to a plurality of components in a network so that the interstices of the network contain the exudable material. Numerous other arrangements may be devised by those skilled in the art without departing from the spirit and scope of this invention.

What is claimed is:

1. The method of incasing electrical apparatus which comprises covering the apparatus with a self-sustaining layer of a first material, mounting a venting tube so that one orifice contacts the first material and incapsulating the apparatus with a second material, the first material being of such character that it flows, when subjected to the heat and pressure created during the incapsulating operation whereby any internal pressures developed between the apparatus and the second material are relieved by the bleeding of said first material through said venting tube.

2. The method of incapsulating an electrical component which comprises coating said component with a first self-sustaining layer of material which becomes fluid at a temperature in excess of 150 degrees Fahrenheit, mounting a venting tube with one orifice engaging said first layer, casting a second layer of resinous material over said first layer, and curing said second layer at a temperature in excess of the melting temperature of said first layer whereby any internal pressure which tends to develop between said second layer and said component is relieved by the bleeding of the material of said first layer through said venting means.

3. The method of incapsulating an electrical component which comprises covering said component with a self-sustaining layer of mineral wax of microcrystalline structure which melts at a temperature in excess of 150 degrees Fahrenheit, mounting a venting tube with one orifice engaging said mineral wax, casting a second layer of resinous material over said layer of mineral wax and curing said second layer at a temperature in excess of the melting temperature of said mineral wax whereby any internal pressure which tends to develop between said second layer and said component is relieved by the bleeding of said mineral wax through said venting tube.

4. The method of incapsulating an electrical component which comprises covering said component with a self-sustaining layer of a viscous gel, mounting a venting means with one orifice embedded in said gel, applying a second layer of material over said gel and curing said second layer at a temperature at which said gel is sufficiently fluid to relieve any internal pressure which tends to develop between said second layer and said component by the bleeding of said fluid gel through said venting means.

5. The method of incapsulating an electrical component which comprises covering said component with a self-sustaining first layer of material which becomes fluid at a temperature in excess of 150 degrees Fahrenheit, mounting a venting means with one orifice engaging said first layer, applying a second layer of a styrene polyester casting resin over said first layer and curing the material of said second layer at a temperature in excess of the temperature at which the material of said first layer becomes fluid whereby any internal pressure which tends to develop between said second layer and said component is relieved by the bleeding of the material of said first layer through said venting means.

6. The method of incapsulating an electrical component which comprises covering said component with a self-sustaining layer of a mineral wax of microcrystalline structure which melts at a temperature in excess of 150 degrees Fahrenheit, mounting a venting means with one orifice engaging said layer of mineral wax, suspending said component in a mold by its leads, pouring a styrene polyester casting resin into said mold to cover said component and curing said casting resin with the aid of externally applied heat at a temperature in excess of the melting temperature of said wax whereby any internal pressure which tends to develop between said casting resin and said component is relieved by the bleeding of said mineral wax through said venting means.

References Cited in the file of this patent

UNITED STATES PATENTS

| Number | Name | Date |
|---|---|---|
| 917,018 | Dempster | Apr. 6, 1909 |
| 1,497,449 | Kempton | June 10, 1924 |
| 1,592,536 | O'Neill | July 13, 1926 |
| 2,414,525 | Hill et al. | Jan. 21, 1947 |
| 2,548,353 | Cunningham | Apr. 10, 1951 |